E. E. CLARK.
VALVE INDICATOR.
APPLICATION FILED APR. 3, 1916.
1,235,767.
Patented Aug. 7, 1917.
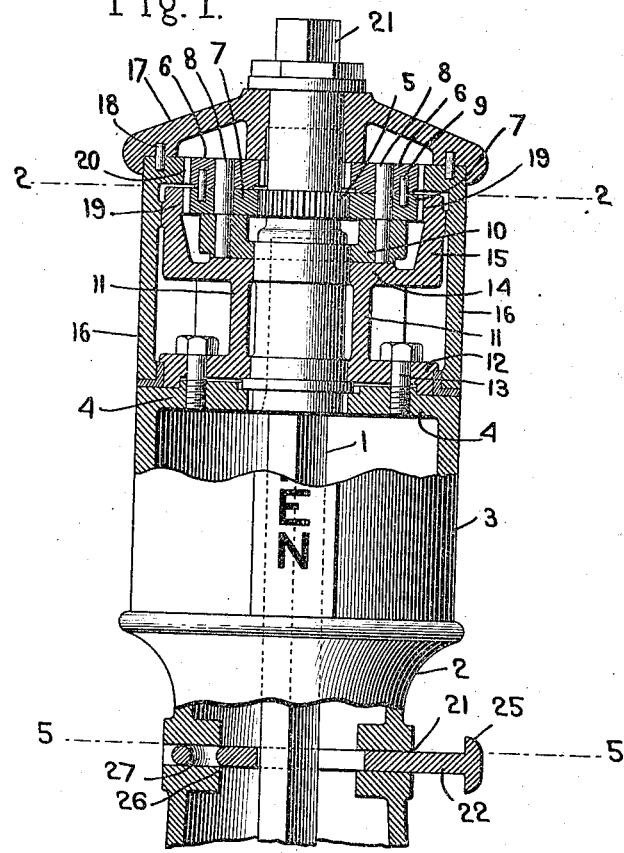
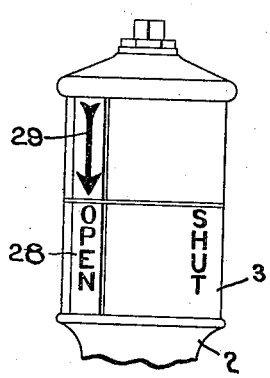
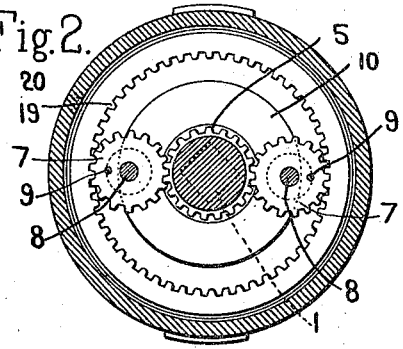
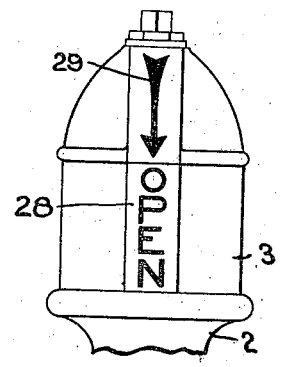
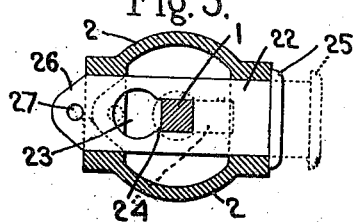
Inventor.
Ezra E. Clark,
by Heard Smith & Tennant.
Attys.

UNITED STATES PATENT OFFICE.

EZRA E. CLARK, OF NEWTONVILLE, MASSACHUSETTS.

VALVE-INDICATOR.

1,235,767.  Specification of Letters Patent.  Patented Aug. 7, 1917.

Application filed April 3, 1916. Serial No. 88,443.

*To all whom it may concern:*

Be it known that I, EZRA E. CLARK, a citizen of the United States, residing at Newtonville, county of Middlesex, State of Massachusetts, have invented an Improvement in Valve-Indicators, of which the following description, in connection with the accompanying drawing, is a specification, like characters on the drawing representing like parts.

This invention relates to new and useful improvements in mechanisms for indicating the position of valves and is particularly directed to that class of valves used in connection with large mains.

In large industrial plants, such as mill-yards, the valves are placed below the ground and are controlled by means of a spindle mounted in a standard or indicator post projecting above the ground. It is highly advantageous, if not essential, that means be afforded for indicating accurately at all times the position of the valve. Various means have been employed for this purpose, such as, for example, the provision of openings and glass-closed windows in the different standard casings. Indicating means are movably mounted within the standard so that the various indicia are disclosed through the openings or the windows. The defects of this construction are that dirt, sticks, stones and other objects enter through the openings or the glass is often broken, and such objects enter; that rain and snow enter such openings and, due to exposure to the element, ice often forms inside the casing, interfering with the proper functioning of the device; and that more particularly the indicating means are but imperfectly perceptible or viewable at a short distance from the standard.

Another serious defect in prior constructions usually due to mal-adjustment lies in the possibility of the movable target striking a fixed part of the mechanism before a complete opening of the valve, thereby giving a false indication of the condition of the valve.

This invention is designed to produce a device which obviates these difficulties and is more nearly "fool-proof." For these purposes the standard is preferably provided with an exterior member which is movable relatively to the standard, the indicating mechanism being borne upon the outside of the movable member, or, the valve position is indicated by means of the coöperation of indicia on the movable member and complementary means upon the outside of the stationary portion of the standard. Therefore, openings into the interior of the standard are obviated and the attendant disadvantages are overcome. By the use of indicating means upon the exterior of the standard, ample provision is easily made for the employment of such targets or signals as can be intelligently viewed a far greater distance than with the type commonly in use at the present time.

Furthermore, the rotating movement of the movable member may be continued indefinitely until the valve be completely open, or completely shut, and a false indication obviated, due to the clashing of the movable and fixed members.

This novel improvement is here shown and described as applied to that class of valve mechanisms in which the valve spindle has only a rotatable movement and does not move longitudinally although obviously with slight modification it may be adapted to other types. The standard is provided with a suitable casing, the upper part of which is revolubly mounted. This casing is without openings and has the indicating means cast, secured, painted or otherwise associated both with the revoluble casing and with the stationary portions of the standard. Means are provided for causing the revolution of the movable casing upon actuation of the rotatable spindle. The spindles in these valve mechanisms require a number of turns, more or less, to open or close the valves, dependent on pitch of operating screw and size of valve, hence it is desirable that some reduction gearing be employed to revolve the movable indicia-bearing casing the needed amount upon the actuation of the spindle. To accomplish this function this structure is provided with an epicyclic gear train comprising a train of spur wheels having one or more of the wheels movable bodily around the circumference of another wheel which may be fixed or movable.

Through the employment of the movable casing, the indicating means may be placed on the exterior of the standard and may be of a size suitable to be read at varying distances. Furthermore, in this structure the indicating means may be simply broad colored stripes, one being borne by the movable member and one by the standard so that upon registering of the two stripes the open or closed position of the valve may be indicated.

The object of this invention is to provide valve indicating means which are reliable, efficient, which will show the position of the valve at any time, and which are easily read at any angle and at relatively long distances.

Other objects of the invention will more fully appear from the following description and the accompanying drawings and will be pointed out in the annexed claims.

In the accompanying drawings there has been disclosed an organization which is designed to carry out the invention; but, it is to be understood that the invention is not confined to the exact feature shown, as various changes may be made within its reasonable scope.

Figure 1 is a partial vertical sectional view through an indicator post having this novel improvement embodied therein;

Fig. 2 is a sectional view on the line 2—2 of Fig. 1;

Fig. 3 is a perspective of the upper portion of the standard, showing one form of indicating media;

Fig. 4 is a similar perspective showing a modified form of indicator post;

Fig. 5 is a section on the line 5—5, Fig. 1.

This invention is adapted for use with different types of valves, but is particularly suitable for use with the usual indicator post employed in millyards and other establishments where the flow through large mains is controlled by gate valves. The type here shown is one wherein the spindle is rotatable but is without longitudinal movement. The spindle 1 is rotatably mounted in the standard 2, a part of which only is shown. The post standards of this type extend below the ground to the valve at which point the spindle is fixed to the valve stem. The connection between the spindle and the valve stem, being of any well-known type and therefore immaterial to this invention, is not here shown. While the hollow standard 2 may cover the major portion of the indicating parts of the post, there is here disclosed a generally cylindrical casing 3 which is secured to the standard 2. This casing which may be designated as the stationary casing has, in this selected embodiment, an annular flange 4, the upper face of which functions as the base of the gear chamber.

Herein, there is provided a differential gearing for the purpose of transmitting the spindle movement so as to actuate differentially the revoluble casing. This differential gearing is preferably of the epicyclic train type and may consist of a train of spur or beveled wheels, pulleys, &c., having one or more of the wheels, &c., constrained to move bodily around the circumference of another wheel, pulley, or the like, which may be fixed or moving. A simple and efficient organization of this type is here shown to carry out this function. The spindle 1 at its upper part is provided with annular teeth, as for example, by means of a spur 5. Moving bodily and concentrically about the circumference of the spur 5 are a pair of planet gears 6 and 7. These two planet gears are preferably mounted upon the same stud shaft 8 and are dependently rotatable, being secured together by means of the pin 9. The shaft 8 is mounted upon and borne by a movable annular ring 10. Similar gears 6 and 7 are preferably provided upon the ring 10, diametrically opposite these planet gears, so that gear transmission is equalized thereby. An annular bearing for the ring 10 is provided by means of a cylindrical structure such as a flanged shell 11. This shell which incloses the spindle for its major portion has a lower flange 12 which is secured to the flange 4 of the stationary casing 3 by means of the bolts 13. The top face of the upper flange 14 of the shell 11 functions as the annular bearing for the ring 10. The flange 14 is provided with an annular shoulder 15. The substantially cylindrical casing 16 is revolubly mounted upon the stationary casing 3 and is movable concentrically the spindle 1. An annular, substantially L-shaped, piece of bearing metal is preferably inserted between the lower circumferential edge of the revoluble casing 16 and the outer portion of the annular flange 4 of the stationary casing 3. The upper portion of the revoluble casing has a cap 17 preferably secured thereby by pins 18.

The lower planet gears 7 respectively intermesh with diametrically opposed portions of the annular teeth of the spindle 1 and with the internal circumferential teeth 19 borne by the shoulder 15 of the shell 11. The upper planet gears 6, which are pinned to and are dependently rotatable with the lower gears 7, mesh with the similar internal circumferential teeth 20 borne by the revoluble casing.

The spindle 1 is rotated by means of any instrumentality suitable to engage the end 21 thereof, such movement effecting the rotation of the spindle spur 5. This causes the actuation of the intermeshing lower planet gears 7, but, as they are also in mesh with the circumferential teeth 19 of the stationary shell shoulder 15, the ring 10 must revolve about the spindle. As is usual in gearing of this type, the number of teeth of one of the transverse pairs of planet gears is different from that of the other transverse pair so that a differential drive is effected—alterable at will by modifying the teeth arrangement. Therefore, the rotating, revolubly carried, upper gears 6 impart a differential movement to the revoluble casing.

To guard against unauthorized manipulation of the valve, this valve-indicating means is provided with a locking device. While any suitably efficient means may be employed, there is disclosed herein a novel locking means which is easily accessible yet is out of the way of manipulation of the valve control. This novel construction is shown in Figs. 1 and 5. A transverse slot 21 is provided in the standard below the casing and a slide 22 is mounted to reciprocate therein. This slide, preferably of metallic substance, has a circular aperture 23 therein, in which the spindle may freely rotate. An angular way 24 leads from the aperture 23 and is of a dimension such that it may closely fit the adjacent spindle portion which, in this embodiment, is shown as rectangular in section. A shoulder 25 is formed in one end of the slide to afford a means for effectually closing this opening into the standard and for ease of manipulation. A locking portion 26 is afforded at the opposite end of the slide. An aperture 27 is provided therein through which, when the slide is positioned as in Fig. 5, a padlock, locking chain or other similar device may be passed. When in such locked position, the slide cannot be drawn either way and hence the rectangular spindle portion remains positively locked against rotatory movement by the way 24. Upon removal of the locking media, the slide may be withdrawn to the position shown in dotted lines in Fig. 5 when the spindle portion is concentric the circular aperture 23 and is then freely allowed to rotate.

Various means may be employed in connection with this novel organization whereby visual, audible or other signaling functions are attained. By the placing of the complementary or coöperating signaling means wholly upon the exterior of the indicator post, it is very simple to afford a wide viewing range of the visual signal means. Such signaling means may consist in the employment of a relatively broad, preferably strikingly contrasting, stripe placed upon the revoluble casing and upon the stationary casing portion or, as preferred, in the employment of word signals and an indicator cast integrally with, secured directly to or otherwise associated with the two casing members. In the selected embodiment shown herein, there are employed the two words "Open" and "Shut." Character-bearing raised portions, such as a plate 28, are provided on the casing members.

These characters may be upon such plates as shown in Fig. 4, or may be, as shown by the word "Shut" in Fig. 3, directly upon the stationary casing, or may be painted on, or cast in the metal casing and then painted. Such word signals are alternately disposed about the stationary portion of the casing at desired circumferential positions. Complementary thereto and coöperatively functioning therewith are preferably a pair of suitable attention-directing characters or symbols which are positioned upon the upper or revoluble casing in such way that when the valve is in open position, the revoluble casing symbol is in vertical alinement with the word "Open" and in alinement with "Shut" when the valve is in such position. In Fig. 3, an arrow 29 is illustrated, a similar arrow being positioned on the casing diametrically opposite to the one shown. Obviously, when the revoluble casing is turned from the open position shown in Fig. 3, to the closed position, the arrows respectively will point to the word "Shut." It is thus apparent that the relative positions of the two plates may be viewed a much greater distance than is now practicable with the present window and casing-opening structures wherein the visual signaling words or indicating means are upon an interior member. Furthermore, by the employment of a plurality of exteriorly positioned sigaling means the valve position is easily viewed from all angles. Such an embodiment provides an indicating means which is intelligible to workmen of greater or less skill and mentality.

In Fig. 4 is shown a selected type of a symmetrically formed indicator post having these novel improvements embodied therein. Obviously, but slight modification and transposition of the actuating mechanism is entailed in the construction of this form.

There is thus provided a durable, efficient valve indicating mechanism. Its actuating and transmission parts are practically fool-proof and securely protected from injury by the elements or from missiles commonly thrown thereagainst. It is readily viewable from substantially all angles and its signaling means are simple and are easily made intelligible to those unable to read.

It is to be understood that the construction disclosed herein is illustrative but not restrictive and that the same may be modified within the meaning and scope of the claims which follow.

Having fully described my invention, what I claim as new and desire to secure by Letters Patent is:

1. A valve indicator comprising a stationary standard member, a valve-controlling spindle rotatably journaled in said standard member, a rigid protecting casing member having its upper end journaled upon said spindle and its lower end revolubly supported upon said standard member, means for causing the spindle rotation to revolve said casing member and coöperating indicia upon the rotatable and stationary members to signify the position of the valve.

2. A valve indicator comprising a stationary standard member, a valve-controlling spindle rotatably journaled in said standard member, a rigid protecting casing member having its upper end journaled upon said spindle and its lower end revolubly supported upon said standard member, and means within said casing for causing the rotation of the spindle differentially to revolve said casing and coöperating indicia upon the rotatable and stationary members to signify the position of the valve.

3. A valve indicator comprising a stationary standard member, a valve-controlling spindle rotatably journaled in said standard member, a rigid protecting casing member having its upper end journaled upon said spindle and its lower end revolubly supported upon said standard member and means including planetary gearing within said casing connecting said spindle and said casing adapted to cause the rotation of said spindle differentially to revolve said casing and coöperating indicia upon the rotatable and stationary members to signify the position of the valve.

4. A valve indicator comprising a standard, a valve controlling spindle rotatable in the standard, a revoluble member on the standard, indicating means, and an epicyclic train to cause the spindle motion differentially to drive the revoluble member whereby the valve position is indicated.

5. A valve indicator comprising a standard, a valve-controlling spindle rotatable in the standard, a revoluble member on the standard, indicating means, gear teeth fixed to and movable with said spindle, circumferential internal teeth on said revoluble member, and planet gears differentially to transmit the spindle movement to said revoluble member whereby the valve position is indicated.

6. A valve indicator comprising a standard, a valve-controlling spindle rotatable in the standard, a revoluble member on the standard, indicating means, gear teeth fixed to and movable with said spindle, circumferential internal teeth on said revoluble member, a movable ring concentric with said spindle, planetary gearing mounted on said movable ring and functioning differentially to transmit spindle movements to said revoluble member whereby the valve position is indicated.

7. A valve indicator comprising a standard, a valve-controlling spindle rotatable in the standard, a revoluble casing on a standard, indicating means, annular gear teeth fixed to and movable with said spindle, an annular shell in said casing fixed to the standard, circumferential internal teeth on said revoluble casing and on said annular shell, a movable ring in said shell and concentric with said spindle, a pair of planet gears revolubly mounted on said ring, and means for causing said planet gears to revolve together, whereby spindle movement is differentially imparted to said revoluble casing and the valve position indicated.

8. A valve indicator, comprising a standard, a valve-controlling spindle rotatable in the standard, a revoluble casing on the standard, indicating means, annular gear teeth fixed to and movable with said spindle, an annular shell in the casing fixed to the standard, internally circumferential teeth on said revoluble casing and on said annular shell, a movable ring on said shell, and concentric with said spindle, and opposed pairs of planet gears revolubly mounted on said ring, whereby spindle movement is differentially imparted to said revoluble casing and the valve position thereby indicated.

In testimony whereof, I have signed my name to this specification.

EZRA E. CLARK.

Copies of this patent may be obtained for five cents each, by addressing the "Commissioner of Patents, Washington, D. C."